Nov. 14, 1944.    L. E. ALBERTSON    2,362,607
FEEDER
Filed July 24, 1943    2 Sheets-Sheet 2
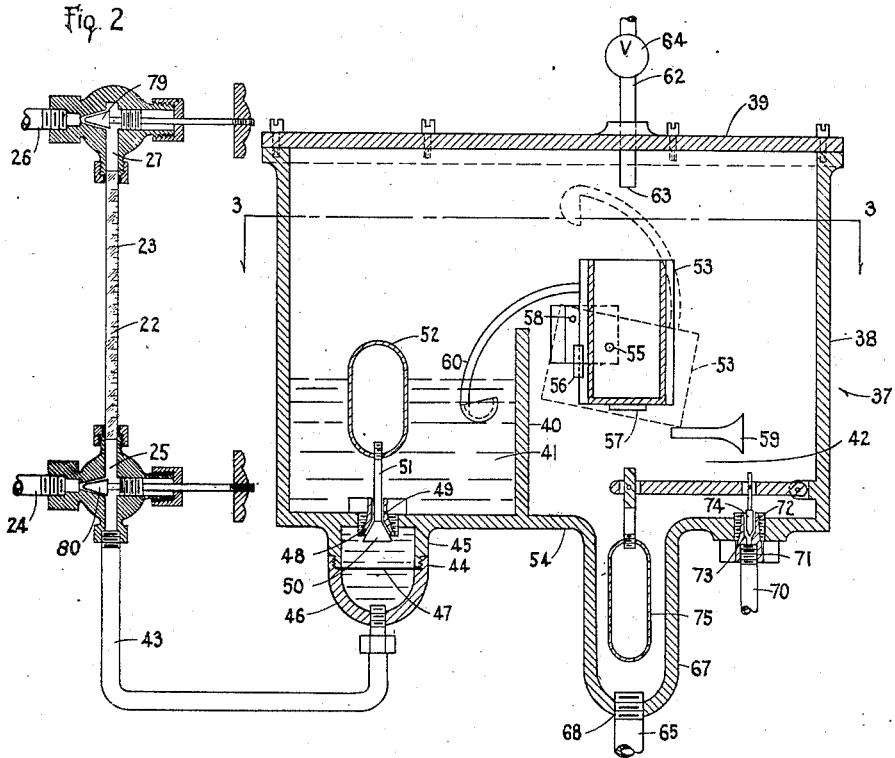
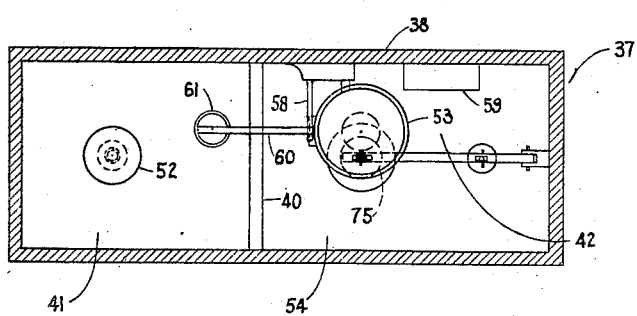
INVENTOR
LAWRENCE E. ALBERTSON
BY *G. H. Braddock*
ATTORNEY Patented Nov. 14, 1944

2,362,607

UNITED STATES PATENT OFFICE 2,362,607

FEEDER

Lawrence E. Albertson, St. Paul, Minn., assignor to The McKays Company, St. Paul, Minn., a corporation of Delaware Application July 24, 1943, Serial No. 495,992

19 Claims. (Cl. 210—31)

This invention has relation to a feeder apparatus for causing liquids from different sources under pressure to become intermingled in predetermined proportions and delivered as a mixture of the intermingled liquids to a location for use. There are many different liquids upon which the feeder apparatus can operate in commercial practice and cause to become mixed. Merely by way of example, said feeder apparatus can operate advantageously upon water and chlorine solution and cause these to become intermingled in predetermined proportions and delivered as a mixture to a location for use.

An object of the invention is to provide a feeder apparatus of the kind as stated which will be of novel and improved construction.

A further object is to provide a feeder apparatus wherein will be incorporated various improved features and characteristics of construction novel both as individual entities of the feeder apparatus and in combination with each other designed with the end in view of causing liquids from different sources under pressure to become intermingled in predetermined proportions and delivered as a mixture of the intermingled liquids at a location where said mixture is to find use.

A further object is to provide a feeder apparatus which will include a vessel adapted to contain a liquid, such, for example, as water, under head pressure, a chamber in open relation to the vessel adapted to contain air under pressure of the liquid, or water, in said vessel, a reservoir in open relation to the chamber adapted to contain a liquid, such, for example, as chlorine solution, under pressure of the air in said chamber, and novel and improved instrumentalities through the medium of which said liquids, or water and chlorine solution, can be caused to become intermingled in predetermined proportions and delivered to a location for use.

A further object is to provide a feeder apparatus, for causing liquid substances from different sources under pressure to become intermingled in predetermined proportions and delivered as a mixture of the intermingled liquid substances to a location for use, which will be responsive in its operation in novel and improved manner to head pressure upon one of the liquid substances and to air under pressure of said head pressure upon another of the liquid substances.

A further object is to provide a feeder apparatus which will include a first quantity of liquid under head pressure, a second quantity of liquid under pressure of air existent by reason of said head pressure, and new and improved instrumentalities housing and interconnecting said first and second quantities of liquid so that liquid of one of said quantities is adapted to become intermingled with liquid of the other of said quantities in novel and improved manner and so that liquid of the different quantities, respectively, can be combined in predetermined proportions for delivery as a mixture of liquids from the different quantities to a location for use.

A further object is to provide a feeder apparatus which will include a vessel adapted to contain a quantity of a liquid under head pressure, a chamber in open relation to the vessel adapted to contain air under pressure of the liquid in said vessel, a reservoir in open relation to the chamber and isolated from the vessel adapted to contain a quantity of liquid under pressure of the air in said chamber, and novel and improved instrumentalities through the medium of which said liquid under head pressure and said liquid under air pressure can be caused to become intermingled in predetermined proportions and delivered to a location for use.

A further object is to provide a feeder apparatus of the nature as set forth, for causing liquids from different sources under pressure to become intermingled in predetermined proportions and delivered as a mixture of the intermingled liquids to a location for use, which will include a novel and improved construction and arrangement for varying at will the relative proportions of the different liquids, respectively, of said mixture.

A further object is to provide a feeder apparatus of the present character which will include a novel and improved construction and arrangement for causing liquids from different sources under pressure to become intermingled.

A further object is to provide in the feeder apparatus a construction and arrangement including a container, a dipper and a tilt bucket for causing liquids from different sources under pressure to become intermingled.

A further object is to provide in the feeder apparatus a construction and arrangement including a float controlled container, a dipper, a tilt bucket and a receiving location or compartment for causing liquids from different sources under pressure to become intermingled in predetermined proportions.

A further object is to provide in the feeder apparatus a novel and improved construction and arrangement whereby accurate reading can be taken of the relative proportions in which liquids from different sources under pressure are being caused to become intermingled from time to time in said apparatus.

And a further object is to provide a feeder apparatus incorporating the various features and characteristics of construction hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is an enlarged vertical central sectional view detailing mechanisms of the feeder; and Fig. 3 is a horizontal sectional view, taken as on line 3—3 in Fig. 2.

Figure 1:
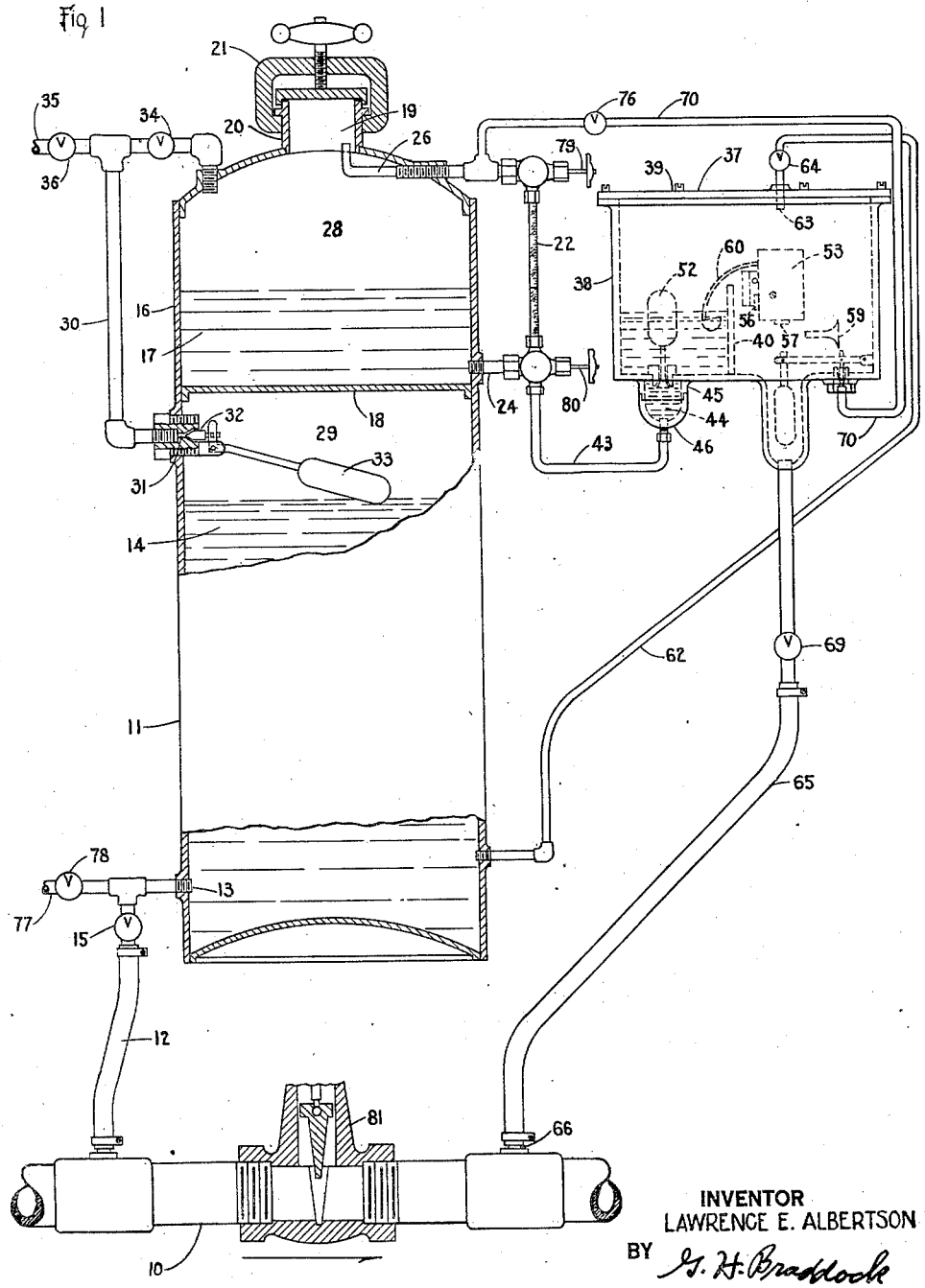
Fig. 1 is a more or less diagrammatic view of a feeder in which the features and characteristics of the invention are incorporated.

A single embodiment of the invention has been illustrated and will be described. The present invention is, however, susceptible of embodiment in various forms.

With respect to the drawings and the numerals of reference thereon, a supply pipe 10 is adapted to lead from a source (not shown) of liquid, such as water, under head pressure. A vessel 11 for liquid from the supply pipe 10 is connected with said supply pipe by a connecting pipe 12. As disclosed, the connecting pipe 12 enters a lower portion of the vessel 11 at 13. Said vessel 11 is adapted to receive liquid, or water, 14 from the supply pipe 10, and a manually actuable valve 15 in the connecting pipe 12 is for controlling flow of liquid or water into the vessel 11.

A reservoir 16 for a liquid 17, such, for example, as chlorine solution, and air under pressure is constituted as an upper portion of a tank providing the vessel 11, as well as said reservoir 16. A partition of the tank between the vessel 11 and the reservoir 16 is denoted 18. The liquid, or chlorine solution, 17 is adapted to be placed in the reservoir 16 through an opening 19 of a neck 20 upon an upper portion of said reservoir 16, and a removable closure member 21 is for effectively covering and closing the opening 19.

The construction and arrangement are such that the level of liquid, or chlorine solution, 17 within the reservoir 16 is visible. To this end a liquid level indicator 22, calibrated as at 23, is provided. A lower portion of the interior of the reservoir 16 is in connection with the lower end of the indicator 22 by way of an outlet connection 24 leading from said reservoir 16 to a liquid conveying connection 25 joined to the lower end of said indicator, and an upper portion of the interior of the reservoir 16 is open to the upper end of the indicator 22 by way of an air connection 26 leading from said reservoir and an air connection 27 joined to the upper end of said indicator.

The reservoir 16 provides a chamber 28, above and in open relation to the liquid, or chlorine solution, 17 in said reservoir 16 adapted to contain air under pressure of liquid, or water, 14 in the vessel 11, and hence under the head pressure of liquid, or water, in the supply pipe 10. More explicitly, a chamber 29 for air under pressure of the head pressure is existent in the upper portion of the vessel 11, above the liquid, or water, 14 in said vessel, and an air conveying connection 30 leads from said chamber 29 into an upper portion of the chamber 28. An inlet 31 of the air conveying connection 30 is controlled by a needle valve 32 itself controlled by a float 33 within the chamber 29. The construction and arrangement are such that the needle valve 32 is normally in the open condition of the inlet 31, and that said needle valve will cause said inlet to become sealed closed in response to elevation of the liquid, or water, level in the vessel 11. Air under pressure is adapted to pass freely from the chamber 29 through the inlet 31 and the air conveying connection 30 into the chamber 28, but liquid, or water, is precluded from passing the inlet 31 due to the fact that with rising of liquid, or water, in the vessel 11 to the elevation of the float 33 said float will be actuated to cause the needle valve 32 to seal said inlet 31 closed. A manually actuable valve 34 in the air connecting pipe 30 is for controlling the passage of air under pressure from the chamber 29 into the chamber 28. A branch pipe 35 leads into the connection 30 and may be employed for the purpose of maintaining or increasing the air cushion in said chamber 28, as by means of an air pump (not shown), or otherwise. A manually actuable valve in the branch pipe 35 is represented by reference character 36.

It will be observed that the reservoir 16 is isolated from the vessel 11 in such manner that there is no possibility for interchange of the liquid, or water, 14 and the liquid, or chlorine solution, 17 between said vessel and reservoir. That is, no liquid can possibly flow from the vessel 11 to the reservoir 16, or from said reservoir to said vessel. Air under pressure within the chamber 28, the connection 30 and the chamber 29 will effectively preclude passage of the liquid, or chlorine solution, 17 from the reservoir to the vessel; and upon dissipation of air from said vessel so that the level of the liquid, or water, 14 rises to the elevation of the float 33, the needle valve 32 will cut off passage of liquid, or water, from the vessel to the reservoir.

A construction and arrangement of the feeder apparatus for causing liquids, such as the liquid, or water, under head pressure in the supply pipe 10 and the liquid, or chloride solution, 17 in the reservoir 16, from different sources under pressure to become intermingled in predetermined proportions and delivered as a mixture of the intermingled liquids at a location where the mixture is to find use, includes a mixing receptacle 37. Said mixing receptacle is constituted as a rectilinear housing 38 sealed closed by a removable cover 39.

A transversely disposed partition 40 within the housing 38 divides said housing into a container 41 at one side of the housing and a mixture receiving location or compartment 42 at the opposite side of said housing.

A feed pipe 43 for the liquid, or chlorine solution, 17 leads from the liquid conveying connection 25 into the lower part of a well 44 beneath the container 41. As disclosed, the upper portion of the well 44 is constituted as an annular element 45 integral with the housing 38, and the lower part of said well 44 consists of a dome 46 screwed onto said annular element 45. A filtering screen 47 within the well 44 and having its margin rigidly secured between the element 45 and the dome 46 is for an obvious purpose. A valve seat 48, at the upper portion of the well 44 in surrounding relation to an opening 49 in the base of the container 41, between the interiors of said well and container, is adapted to be normally open but closable by a valve 50 within the well and beneath said valve seat 48. A stem 51 for the valve 50 passes freely upwardly through the opening 49, and the upper end of said stem 51 is rigid with a float 52 within the container 41. The construction and arrangement are such that a constant level of the liquid or chlorine solution is maintained in the container 41. Stated otherwise, the level of the liquid, or chlorine solution, 17, of course flowing to the container 41 from the reservoir 16, in said container 41 is maintained substantially constant by the float 52.

A tilt bucket 53 is situated within the mixture receiving location or compartment 42 of the mixing receptacle 37, at elevation above the base 54 of the housing 38. Said tilt bucket 53 is pivotally supported, as at 55, upon a side wall of said housing 38, in adjacent relation to the partition 40, for swinging movement in a vertical plane toward and away from said partition. The pivotal support or axis 55 for the tilt bucket is spaced from the longitudinal axis of said tilt bucket, at the left of said longitudinal axis; that is, at the side of the axis of the tilt bucket adjacent the partition 40; in the disclosure as made. A counterweight 56 upon the side wall of the tilt bucket and adjacent the partition 40, and a counterweight 57 upon the base of said tilt bucket. are for the purpose of retaining the tilt bucket when empty or substantially empty in upright position, as disclosed in full lines in Fig. 2 of the drawings. The construction and arrangement are such that upon a reception of a predetermined amount of liquid, or water, 14 the tilt bucket 53 will become tipped, or moved to the dotted line position in said Fig. 2, thus to cause liquid, or water, to become removed or spilled from said tilt bucket and deposited into the mixture receiving location or compartment 42. After tipping, the tilt bucket will move from its dotted line position to its full line position in Fig. 2, due to the weight of the counterweights 56 and 57. A stop 58 is for limiting swinging movement of the tilt bucket 53 in direction toward the partition 40, and a stop 59 is for limiting swinging movement of said tilt bucket in direction away from said partition and toward the base 54 of the housing 38.

An arm 60, rigidly secured to an upper portion of the tilt bucket 53, extends outwardly and downwardly from said tilt bucket at the side thereof adjacent the container 41, and a dipper 61 fixed to the outer end of said arm 60 is adapted to be submerged in liquid, or chlorine solution, in said container 41 when said tilt bucket is in upright position. With each tipping of the tilt bucket 53, or movement of said tilt bucket from the full line position in Fig. 2 to the dotted line position, a dipper full of liquid, or chlorine solution, is removed from the container 41 and deposited in the mixture receiving location or compartment 42. That is, upon the tipping of the tilt bucket, the dipper is moved from its full line position to its dotted line position in said Fig. 2. Upon return of said tilt bucket to upright position, said dipper becomes again situated below the level of the liquid, or chlorine solution, in said container 41. When a dipper full of liquid, or chlorine solution, is removed from the container 41, the float 52 will become slightly depressed to cause the valve 50 to open. Said valve 50 will remain open until substantially a dipper full of liquid, or chlorine solution, from the well 44 has replaced the liquid, or chlorine solution, removed from said container 41, and then the valve will close, by reason of elevation of said float 52.

A liquid or water feed pipe 62, leading from a lower portion of the vessel 11, enters the cover 39 of the mixing receptacle 37 and includes an open, delivery end 63 directly above the tilt bucket 53. Said feed pipe 62 is adapted to deliver liquid or water directly into said tilt bucket 53 when the latter is in upright position. A manually actuable valve 64 in the liquid or water feed pipe 62 is for controlling and regulating flow of liquid or water from said vessel 11 into said tilt bucket 53.

A discharge pipe 65 for mixture of liquids leads from the mixture receiving location or compartment 42 and enters the supply pipe 10 at location, denoted 66, in spaced relation to the connecting pipe 12, at the side of said connecting pipe opposite the source of liquid or water. The base 54 of the housing 38 includes a concavity 67, and the discharge pipe 65 is suitably and conveniently connected at 68 with said base 54 at the bottom of said concavity. A manually actuable valve 69 in the discharge pipe 65 is for controlling and regulating the amount or rate of flow of mixture of liquids through said discharge pipe 65.

A pipe connection 70 for air leads from the air connection 26 to the interior of the mixing receptacle 37. More explicitly, the end of the pipe connection spaced from the air connection 26 is secured at 71 to the base 54 of the housing 38, and said pipe connection 70 is adapted to communicate with the interior of the housing 38 through an opening 72 providing a valve seat 73. Said opening 72 is controlled by a needle valve 74 adapted to engage said valve seat 73, and the needle valve is controlled by a float 75 within the concavity 67. The construction and arrangement are such that the needle valve 74 moves toward open position upon elevation of the float 75 and toward closed position upon depression of said float. A manually actuable valve 76 in said pipe connection 70 is for controlling passage of air from the chamber 28 to the interior of the mixing receptacle 37.

A manually actuable valve 79 is for controlling passage of air by way of the air connection 27 to the upper end of the liquid level indicator 22, and a manually actuable valve 80 is for controlling passage of liquid, or chlorine solution, 17 from the reservoir 16 by way of the outlet connection 24, the liquid conveying connection 25 and the feed pipe 43 to the well 44. The manually actuable valve 80 is of construction to be capable of cutting off flow of liquid, or chlorine solution, from the reservoir 16 without interfering with flow from the liquid level indicator 22 through the connection 25 and the pipe 43 to the well 44.

Passage of liquid or water through the supply pipe 10 is adapted to be adjustably controlled by a manually actuable valve 81, disclosed as a gate valve, situated at location between the connecting pipe 12 and the discharge pipe 65.

A drain pipe 77 leading from a lower portion of the vessel 11 includes a usual manually actuable control valve 78. The manual valve 36 may, additionally, serve as a vent valve for said vessel 11.

To provide or replenish air under pressure in the chamber 29, and hence in the chamber 28, it is merely necessary to close valve 15, open drain valve 78 and vent valve 36, thus to cause the vessel 11 to be drained of liquid, or water; and then close drain valve 78 and vent valve 36 and open valve 15 after said vessel is empty. Liquid, or water, under head pressure will flow from the supply pipe 10 through the connecting pipe 12 into the vessel 11 and cause a quantity of air to become trapped under pressure above the liquid, or water. Or, a constant air supply may be maintained within the chambers 28 and 29 through the instrumentality of mechanical or other means.

The feeder apparatus is adapted to cause liquid substances, such, for example, as water from the supply pipe 10 and chlorine solution 17 from the reservoir 16, from different sources under pressure to become intermingled in predetermined proportions in the mixture receiving location or compartment 42 of the mixing receptacle 37 and delivered as a mixture of the intermingled liquid substances to a location for use in response to head pressure upon one of the liquid substances, i. e., water from said supply pipe 10, and to air under pressure of said head pressure upon another of the liquid substances, i. e., chlorine solution in said reservoir 16.

When the outlet connection from the supply pipe 10, at the side of the discharge pipe 65 opposite the gate valve 81, and the valves 78 and 36 are closed, and the valves 15, 32, 34, 64, 69, 76, 79, 80 and 81 are open, so that static conditions prevail, the pressure in the supply pipe 10, the vessel 11, the reservoir 16, the mixing receptacle 37 and the pipe connections and passages of the feeder apparatus will be the same. There will be no flow at all of liquid, or water, 14 or liquid, or chlorine solution, 17 in the feeder apparatus when the conditions are static.

When the valve 81 and the outlet connection from the supply pipe 10 are open, flow of liquid, or water, from said supply pipe, past said valve 81, to and out of said outlet connection will evidently occur by reason of head pressure at the source of the liquid, or water, in the supply pipe.

The valve 81, situated in the supply pipe 10 at location between the connecting pipe 12 and the discharge pipe 65, is adapted to be adjusted to provide an opening past said valve 81 which will cause a predetermined and intended differential in pressure to exist between the upstream and downstream sides of said opening with movement of liquid, or water, through said supply pipe 10 past said connecting pipe 12, the valve 81 and said discharge pipe 65. More explicitly, the gate valve 81 is set, during practical operation of the feeder apparatus, so that the pressure in the mixing receptacle 37 will be somewhat less than the pressure in the upstream part of the supply pipe 10 and in the vessel 11 and the reservoir 16. The amount of differential in pressure which exists at the upstream side of the gate valve 81 and at the downstream side of said gate valve can of course be varied to have any predetermined value which may be intended by adjustment of said gate valve to thus alter, increase or decrease, the size of the opening past the gate valve.

When the valves 78 and 36 are closed and the valves 15, 32, 34, 79 and 80 are open and the outlet connection from the supply pipe 10 is open, and assuming air under pressure in the chambers 28 and 29, said air under pressure will evidently exert effort tending to cause flow of liquid, or chlorine solution, 17 from the reservoir 16 through the feed pipe 43 and the well 44 into the container 41.

Assuming valves 15, 64 and 69 to be open, and air under pressure to be present in the system, it will be evident that with flow of liquid, or water, from the supply pipe 10 past the connecting pipe 12, the gate valve 81 and the discharge pipe 65, there will be flow of liquid, or water, from the vessel 11 through the feed pipe 62 into the tilt bucket 53, as well as capacity for flow from the mixture receiving location or compartment 42 of the mixing receptacle 37 through the discharge pipe 65 to the downstream side of said supply pipe 10, when the gate valve 81 is set to cause the pressure within said mixing receptacle 37 to have value less than the pressure within the upstream side of the supply pipe 10, and hence less than the pressure within the vessel 11. It will also be evident that with increase of the differential in pressure between the upstream and downstream sides of the gate valve 81, there will be proportional increase in the flow of liquid, or water, 14 from the vessel 11 into the tilt bucket 53, and vice versa. Naturally, there will be increase of differential in pressure with increase in the rate of flow of liquid, or water, from the supply pipe 10 out of its outlet connection, and vice versa, and the rate of increase or decrease of differential in pressure will vary in proportion as there is increase or decrease in the rate of flow of liquid, or water, from said supply pipe past the gate valve 81. That is, the amount of liquid, or water, caused to enter the tilt bucket 53 from the vessel 11 will be directly proportional to the amount of liquid, or water, which is caused to flow from the supply pipe 10 past the gate valve 81 and the discharge pipe 65, no matter what may be the rate of speed of travel of the liquid, or water, through said supply pipe.

As will be apparent, substantially all of the liquid, or water, which reaches the mixing receptacle 37 by way of the feed pipe 62 first enters the tilt bucket 53 and is spilled from said tilt bucket to the mixture receiving location or compartment 42. Each time the tilt bucket unloads its content to said mixture receiving location or compartment 42 there is also a dipper full of liquid, or chlorine solution, dumped into the mixture receiving location or compartment. Stated differently, the relative amounts of liquid, or water, 14 and liquid, or chlorine solution, 17 fed to the mixture receiving location or compartment 42 are accurately measured. The relative proportions of the different liquids to be mixed will obviously depend upon the relative sizes of the tilt bucket 53 and the dipper 61, etc. The rapidity of action of the tilt bucket can be controlled by the adjustment of the pressure differential creating means, such as the valve 81, or by regulation of the capacity for flow through the feed pipe 62, as by manipulation of the valve 64, or by both adjustment of said pressure differential creating means and regulation of flow through said feed pipe 62. A range of sizes of dippers, such as 61, can be employed. Obviously, the feeder apparatus includes provision for a very flexible feed as to volume of liquid, or chlorine solution, 17 in proportion to liquid, or water, 14.

The liquid, or chlorine solution, 17 fed to the mixture receiving location or compartment 42 becomes there intermingled with, and only with, the liquid, or water, 14 which flows from the vessel 11 through the feed pipe 62 into the mixing receptacle 37. Evidently, upon union of the liquid, or chlorine solution, which reaches the mixing receptacle from the reservoir 16, with the liquid, or water, 14, which reaches the mixing receptacle from the vessel 11, said liquids, water and chlorine solution, will be mixed together in precisely the proportions which were predetermined, regardless of the value of the differential in pressure between the upstream and downstream sides of the gate valve 81, or equivalent, during operation of the feeder apparatus.

The mixed liquids, water and chlorine solution, will flow from the mixture receiving location or compartment 42 by way of the discharge pipe 65 into the downstream side of the supply pipe 10 and thence to the outlet of said supply pipe. Thus, the portion of the liquid, or water, diverted from the supply pipe 10 by way of the vessel 11 to the mixing receptacle 37 rejoins, and the liquid, or chlorine solution, fed to said mixing receptacle from the reservoir 16 joins, the main body of liquid, or water, on passage from the supply pipe 10 to its outlet connection.

The mixture of liquids, such as water and chlorine solution, which flows from the mixture receiving location or compartment 42 of the mixing receptacle 37 through the concavity 67 and the discharge pipe 65 to the supply pipe 10, may carry along with it some air, thus to cause pressure of air in said mixing receptacle to become reduced. Should this occur, liquid level might possibly be caused to rise in said concavity 67. With rising of liquid level in the concavity 67, the float 75 will be elevated thus to remove the needle valve 74 from its seat and permit air under pressure to flow from the chamber 28 through the air connection 26 and the air pipe 70 into the mixing receptacle 37. Upon replenishment of air under pressure in said mixing receptacle the level of liquid in the concavity 67 will be caused to fall, by reason of pressure of the air, to extent permitting the float 75 to become depressed to cause the needle valve 74 to engage its seat and cut off further flow of air into the mixing receptacle. Evidently, the construction and arrangement are such as to preclude the possibility of back flow of mixed liquids from the discharge pipe 65 to extent liable to cause overflow of the partition 40 or interference with operation of the tilt bucket 53 and the dipper 61. When the needle valve 74 is opened, by elevation of the float 75, there is flow of air under pressure from the chamber 28 into the mixing receptacle 37 which will preclude rising of the liquid level in the concavity 67 even to extent sufficient to cause said float 75 to remain in elevated condition, much less to extent to flood over the partition 40 or to reach the lowermost operating position of the tilt bucket.

One way to accurately measure the amount of liquid, or chlorine solution, 17 being fed from time to time from the reservoir 16 into the container 41, the capacity of the dipper 61 being known, is to count the number of tips per unit of time of the tilt bucket 53. Another and more convenient way to accurately measure the amount of liquid, or chlorine solution, 17 being consumed in the feeder apparatus from time to time is to close the valve 80, thus to shut off flow from the reservoir 16 to the well 44 and permit flow from the liquid level indicator 22 to said well, and take readings from the calibrations 23 upon said liquid level indicator as flow from the liquid level indicator continues. Flow of liquid, or chlorine solution, 17 from said indicator 22 into the well 44 is caused when the valve 80 is in closed position by reason of pressure of air under pressure in the chamber 28 exerted upon the surface of the liquid, or chlorine solution, within the indicator by way of the air connections 26 and 27, past the valve 79 while open.

The feeder apparatus, it will be observed, is of quite simple construction and includes no delicate parts or minute passages liable to become clogged. The only movable parts of the feeder apparatus during its operation in practice are the tilt bucket 53 with the dipper 61 and the several floats and their appurtenances.

What is claimed is:

1. In a feeder apparatus, instrumentalities for causing a first and a second liquid substance from different sources under pressure to become intermingled in predetermined proportions for delivery as a mixture of the intermingled liquid substances to a location for use, comprising a pipe connection for flow of said first liquid substance from a source thereof under head pressure to said location of use, a receptacle including a container and a mixture receiving compartment, means for causing pressure within said receptacle to have value less than the value of said head pressure, means responsive to said head pressure for causing a portion of said first liquid substance to be fed to said mixing compartment of said receptacle, a reservoir adapted to contain said second liquid substance, means for causing pressure of air under pressure of said head pressure to be exerted upon the second liquid substance in said reservoir, a connection between said reservoir and said container adapted to convey a portion of the second liquid substance from the reservoir to the container in response to the action of said pressure of air under pressure of said head pressure, means in said receptacle for successively causing measured quantities of the second liquid substance to be fed from said container to said mixture receiving compartment, and a discharge outlet from said mixture receiving compartment connecting with a portion of said pipe connection at the side of the receptacle opposite the source of said first liquid substance.

2. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a receptacle including a container and a mixture receiving compartment, means for creating a predetermined differential in pressure between said head pressure and the pressure within said receptacle so that said pressure within the receptacle has value less than said head pressure, means responsive to said head pressure for causing a portion of said first liquid substance to be fed to said mixture receiving compartment of said receptacle, a reservoir adapted to contain said second liquid substance, means for causing pressure of air under pressure of said head pressure to be exerted upon the second liquid substance in said reservoir, a connection between said reservoir and said container adapted to convey a portion of the second liquid substance from the reservoir to the container in response to the action of said pressure of air under pressure of said head pressure, a float valve for controlling the level of the second liquid substance in said container, means in said receptacle for successively causing measured quantities of the second liquid substance to be fed from said container to said mixture receiving compartment, and a discharge pipe from said mixture receiving compartment connecting with a portion of said pipe connection at the side of the receptacle opposite the source of said first liquid substance.

3. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a receptacle including a container and a mixture receiving compartment, means for causing pressure within said receptacle to have value less than the value of said head pressure, means responsive to said head pressure for causing a portion of said first liquid substance to be fed to the mixture receiving compartment of said receptacle, a reservoir adapted to contain said second liquid substance, means for conveying quantities of said second liquid substance from said reservoir to said container in response to pressure of air upon said second liquid substance in said reservoir under pressure of said head pressure, means in said receptacle for successively causing measured quantities of said second liquid substance to be fed from said container to said mixture receiving compartment, and a discharge outlet from said mixture receiving compartment connecting with a portion of said pipe connection at the side of the receptacle opposite the source of said first liquid substance.

4. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a receptacle including a container and a mixture receiving compartment, means for creating a predetermined differential in pressure between said head pressure and the pressure within said receptacle so that said pressure within the receptacle has value less than said head pressure, means responsive to said head pressure for causing a portion of said first liquid substance to be fed to the mixture receiving compartment of said receptacle, a reservoir adapted to contain said second liquid substance, means for conveying quantities of said second liquid substance from said reservoir to said container in response to pressure of air under pressure of said head pressure, a float valve for controlling the level of the second liquid substance in said container, means in said receptacle for successively causing measured quantities of the second liquid substance to be fed to said mixture receiving compartment, and a discharge pipe from said receptacle connecting with a portion of said pipe connection at the side of the receptacle opposite the source of said first liquid substance.

5. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a receptacle including a container and a mixture receiving compartment for receiving the first and second liquid substances, means for causing pressure within said receptacle to have value less than the value of said head pressure, means responsive to said head pressure for causing a portion of said first liquid substance to be fed into said receptacle while a main body of the first liquid substance continues its passage toward said location, a reservoir adapted to contain said second liquid substance, means for causing pressure of air under pressure of said head pressure to be exerted upon the second liquid substance in said reservoir, a connection between said reservoir and said container adapted to convey a portion of the second liquid substance from the reservoir to the container in response to the action of said pressure of air under pressure of said head pressure, a device in said receptacle adapted to receive said first liquid substance and actuable at intervals to cause each of measured quantities of the first liquid substance to be deposited to said mixture receiving compartment, means actuable in response to each actuation of said device to cause a measured amount of said second liquid substance to be removed from said container and deposited to said mixture receiving compartment, and a discharge outlet from said mixture receiving compartment connecting with a portion of said pipe connection at the side of the receptacle opposite the source of said first liquid substance.

6. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure to said location of use, a receptacle including a container and a mixture receiving compartment for receiving the first and second liquid substances, means for causing pressure within said receptacle to have value less than the value of said head pressure, means responsive to said head pressure for causing a portion of said first liquid substance to be fed into said receptacle while a main body of the first liquid substance continues its passage toward said location, a reservoir adapted to contain said second liquid substance, means for conveying quantities of said second liquid substance from said reservoir to said container in response to pressure of air under pressure of said head pressure, a float valve for controlling the level of the second liquid substance in said container, a device in said receptacle adapted to receive said first liquid substance and actuable at intervals to cause each of measured quantities of the first liquid substance to be deposited to said mixture receiving compartment, means actuable in response to each actuation of said device to cause a measured amount of said second liquid substance to be removed from said container and deposited to said mixture receiving compartment, and a discharge outlet from said mixture receiving compartment of said receptacle connecting with a portion of said pipe connection at the side of the receptacle opposite the source of said first liquid substance.

7. In a feeder apparatus, instrumentalities for causing a first and a second liquid substance from different sources under pressure to become intermingled in predetermined proportions, for delivery of the intermingled substances as a mixture to a location for use, comprising a pipe connection for flow of said first liquid substance from a source thereof under head pressure to said location of use, a receptacle including a container and a mixture receiving compartment for receiving said first and second liquid substances, means for causing pressure within said receptacle to have value less than the value of said head pressure, means responsive to said head pressure for causing a portion of said first liquid substance to be continuously fed into said receptacle while a main body of the first liquid substance continues its passage toward said location, a reservoir adapted to contain said second liquid substance, means for causing pressure of air under pressure of said head pressure to be exerted upon said second liquid substance in said reservoir, a connection between said reservoir and said container adapted to convey a portion of said second liquid substance from said reservoir to said container in response to the action of said pressure of air under pressure of said head pressure, a device in said receptacle adapted to receive said first liquid substance fed into said receptacle and successively actuable in response to weight of each of successive measured quantities of said first liquid substance to cause each of said measured quantities to be deposited to said mixture receiving compartment, means actuable in response to each actuation of said device to successively remove a measured amount of said second liquid substance from said container and cause said measured amount to be deposited to said mixture receiving compartment, and a discharge pipe from said mixture receiving compartment connecting with a portion of said pipe connection at the side of said receptacle opposite said source of said first liquid substance.

8. In a feeder apparatus, instrumentalities for causing a first and a second liquid substance from different sources under pressure to become intermingled in predetermined proportions, for delivery as a mixture of the intermingled substances to a location for use, comprising a pipe connection for flow of said first liquid substance from a source thereof under head pressure to said location of use, a receptacle including a container and a mixture receiving compartment for receiving said first and second liquid substances, means for causing pressure within said receptacle to have value less than the value of said head pressure, means responsive to said head pressure for causing a portion of said first liquid substance to be continuously fed into said receptacle while a main body of the first liquid substance continues its passage toward said location, a reservoir adapted to contain said second liquid substance, means for conveying quantities of said second liquid substance from said reservoir to said container in response to pressure of air under pressure of said head pressure, a float valve for controlling the level of the second liquid substance in said container, a device in said receptacle adapted to receive said first liquid substance fed into the receptacle and successively actuable in response to weight of each of measured quantities of said first liquid substance to cause each of said measured quantities to be deposited to said mixture receiving compartment, means actuable in response to each actuation of said device to successively remove a measured amount of said second liquid substance from said container and cause said measured amount to be deposited to said mixture receiving compartment, and a discharge pipe from said mixture receiving compartment connecting with a portion of said pipe connection at the side of said receptacle opposite said source of said first liquid substance.

9. In a feeder apparatus, instrumentalities for causing a first and a second liquid substance from different sources under pressure to become intermingled in predetermined proportions, for delivery of the intermingled substances as a mixture to a location for use, comprising a pipe connection for flow of said first liquid substance from a source thereof under head pressure to said location of use, a receptacle including a container and a mixture receiving compartment for receiving said first and second liquid substances, means for causing pressure within said receptacle to have value less than the value of said head pressure, means responsive to said head pressure for causing a portion of said first liquid substance to be fed into said receptacle, a reservoir adapted to contain said second liquid substance, means responsive to pressure of air under pressure of said head pressure for causing a portion of said second liquid substance to be conveyed from said reservoir to said container, means for controlling the level of the second liquid substance in said container, a tilt bucket in said receptacle adapted to receive said first liquid substance fed into said receptacle and successively actuable in response to weight of each of successive measured quantities of said first liquid substance to cause each of said measured quantities to be deposited to said mixture receiving compartment, a dipper in said receptacle actuable in response to each actuation of said tilt bucket to successively remove a measured amount of said second liquid substance from said container and cause said measured amount to be deposited to said mixture receiving compartment, and a discharge outlet from said mixture receiving compartment connecting with a portion of said pipe connection at a side of said receptacle opposite said source of said first liquid substance.

10. The combination as specified in claim 1, wherein said means in said receptacle for successively causing measured quantities of the second liquid substance to become intermingled is constituted as a tilt bucket and a dipper rigid with said tilt bucket.

11. The combination as specified in claim 2, wherein said means in said receptacle for successively causing measured quantities of the first and second liquid substances to become intermingled includes a tilt bucket and a dipper.

12. The combination as specified in claim 6, wherein said device in said receptacle adapted to receive said first liquid substance is constituted as a tilt bucket, and said means actuable in response to each of the actuations of said device is constituted as a dipper.

13. The method of mixing a first and a second liquid substance in predetermined proportions and delivering the substances when mixed to a location for use, consisting of the steps as follows: applying head pressure to said first liquid substance, utilizing said head pressure to force flow of a main body of said first liquid substance toward said location of use, creating a predetermined differential in pressure between said head pressure and pressure existent within a receptacle for said first and second liquid substances so that the pressure within said receptacle has value less than the value of said head pressure, continuously conveying a portion of said first liquid substance to said receptacle in response to said differential in pressure between said head pressure and pressure existent within said receptacle, conveying a portion of said second liquid substance to said receptacle by utilization of pressure of air under pressure of said head pressure concurrently with the feeding of a portion of said first liquid substance to said receptacle, measuring quantities of the first and second liquid substances in said receptacle, and conveying measured portions of said first and second liquid substances from said receptacle to a portion of said main body of the first liquid substance at the side of said receptacle adjacent said location of use and opposite the head pressure applied to said first liquid substance.

14. The method of mixing a first and a second liquid substance in predetermined proportions and delivering the substances when mixed to a location for use, consisting of the steps as follows: applying head pressure to said first liquid substance, utilizing said head pressure to force flow of a main body of said first liquid substance toward said location of use, creating a predetermined differential in pressure between said head pressure and pressure existent within a receptacle for said first and second liquid substances so that the pressure within said receptacle has value less than said head pressure, continuously conveying a portion of said first liquid substance to said receptacle in response to said differential in pressure between said head pressure and pressure existent within said receptacle while the main body of the first liquid substance continues its travel toward said location of use, conveying a portion of said second liquid substance to said receptacle by utilization of pressure of air under pressure of said head pressure concurrently with the feeding of a portion of said first liquid substance to said receptacle, measuring quantities of the first and second liquid substances in said receptacle, and conveying measured portions of said first and second liquid substances from said receptacle to a flowing portion of said main body of the first liquid substance at the side of said receptacle adjacent said location of use and opposite the head pressure applied to said first liquid substance.

15. The method of mixing a first and a second liquid substance in predetermined proportions and delivering the substances when mixed to a location for use, consisting of the steps as follows: applying head pressure to said first liquid substance, utilizing said head pressure to force flow of said first liquid substance toward said location of use, creating a predetermined differential in pressure between said head pressure and pressure existent within a receptacle for said first and second liquid substances so that the pressure within said receptacle has value less than said head pressure, continuously conveying a portion of said first liquid substance to said receptacle in response to said differential in pressure between said head pressure and pressure existent within said receptacle, conveying a portion of said second liquid substance to said receptacle by utilization of pressure of air under pressure of said head pressure, measuring quantities of the first and second liquid substances in said receptacle, and conveying the measured quantities of said first and second liquid substances out of said receptacle.

16. The method of mixing a first and a second liquid substance in predetermined proportions and delivering the substances when mixed to a location for use, consisting of the steps as follows: applying head pressure to said first liquid substance, utilizing said head pressure to force flow of said first liquid substance toward said location of use, creating a predetermined differential in pressure between said head pressure and pressure existent within a receptacle for said first and second liquid substances so that the pressure within said receptacle has value less than said head pressure, continuously conveying a portion of said first liquid substance to said receptacle in response to said differential in pressure between said head pressure and pressure existent within said receptacle, conveying a portion of said second liquid substance to said receptacle by utilization of pressure of air under pressure of said head pressure, confining and controlling the level of said second liquid substance in said receptacle, measuring quantities of the first and second liquid substances in said receptacle, and conveying the measured quantities of said first and second liquid substances out of said receptacle.

17. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure, a receptacle including a container and a mixture receiving compartment, means for causing pressure within said receptacle to have value less than the value of said head pressure, means responsive to said head pressure for causing a portion of said first liquid substance to be fed to said mixture receiving compartment, a reservoir adapted to contain said second liquid substance, means for causing pressure of air under pressure of said head pressure to be exerted upon said second liquid substance in said reservoir, a connection between said reservoir and said container adapted to convey a portion of the second liquid substance from the reservoir to the container in response to the action of said pressure of air under pressure of said head pressure, means in said receptacle for successively causing measured quantities of the second liquid substance to be fed from said container to said mixture receiving compartment, and a discharge outlet from said mixture receiving compartment.

18. In a feeder apparatus, instrumentalities for causing a first and a second liquid substance from different sources under pressure to become intermingled in predetermined proportions, for delivery as a mixture of the intermingled liquid substances to a location for use, comprising a pipe connection for flow of said first liquid substance from a source thereof under head pressure, a receptacle including a container and a mixture receiving compartment, means for causing pressure within said receptacle to have value less than said head pressure, means responsive to said head pressure for causing a portion of said first liquid substance to be fed to said mixture receiving compartment, a reservoir adapted to contain said second liquid substance, means for causing pressure of air under pressure of said head pressure to be exerted upon said second liquid substance in said reservoir, a connection between said reservoir and said container adapted to convey a portion of the second liquid substance from the reservoir to the container in response to the action of said pressure of air under pressure of said head pressure, means for controlling the level of the second liquid substance in said container, means in said receptacle for successively causing measured quantities of the second liquid substance to be fed from said container to said mixture receiving compartment, and a discharge outlet from said mixture receiving compartment.

19. In a feeder apparatus, instrumentalities for causing a first and a second liquid substance from different sources under pressure to become intermingled in predetermined proportions, for delivery as a mixture of the intermingled substances to a location for use, comprising a pipe connection for flow of said first liquid substance from a source thereof under head pressure, a receptacle including a container and a mixture receiving compartment, means for causing pressure within said receptacle to have value less than said head pressure, means responsive to said head pressure for causing a portion of said first liquid substance to be fed to said receptacle, a reservoir adapted to contain said second liquid substance, means for causing pressure of air under pressure of said head pressure to be exerted upon said second liquid substance in said reservoir, a connection between said reservoir and said container adapted to convey a portion of the second liquid substance from the reservoir to the container in response to the action of said pressure of air under pressure of said head pressure, a device in said receptacle adapted to receive said first liquid substance and actuable at intervals to cause each of measured quantities of the first liquid substance to be deposited to said mixture receiving compartment, means actuable in response to each actuation of said device to cause a measured amount of said second liquid substance to be removed from said container and deposited to said mixture receiving compartment, and a discharge outlet from said mixture receiving compartment.

LAWRENCE E. ALBERTSON.